United States Patent [19]

Beck et al.

[11] Patent Number: 5,044,702
[45] Date of Patent: Sep. 3, 1991

[54] HYDRAULIC BRAKE SYSTEM FOR AUTOMOTIVE VEHICLES COMPRISING A TRACTION SLIP CONTROL MEANS

[75] Inventors: Erhard Beck, Weilburg; Dieter Dinkel, Eppstein/Ts., both of Fed. Rep. of Germany

[73] Assignee: Alfred Teves GmbH, Frankfurt am Main, Fed. Rep. of Germany

[21] Appl. No.: 502,396

[22] Filed: Mar. 30, 1990

[30] Foreign Application Priority Data

Mar. 30, 1989 [DE] Fed. Rep. of Germany ....... 3910285

[51] Int. Cl.$^5$ .......................... B60T 8/58; B60T 8/44
[52] U.S. Cl. .................................. 303/100; 303/114; 303/116
[58] Field of Search ................ 303/100, 110, 114, 116

[56] References Cited

U.S. PATENT DOCUMENTS

| | | | |
|---|---|---|---|
| 3,617,099 | 11/1971 | Sugiyama | 303/110 |
| 4,790,608 | 12/1988 | Burgdorf et al. | 303/114 |
| 4,828,337 | 5/1989 | Wagner et al. | 303/114 |
| 4,869,559 | 9/1989 | Klein | 303/114 X |
| 4,932,727 | 6/1990 | Wagner et al. | 303/114 |
| 4,966,420 | 10/1990 | Schiel et al. | 303/114 |

FOREIGN PATENT DOCUMENTS

| | | |
|---|---|---|
| 0279981 | 8/1988 | European Pat. Off. |
| 2168771 | 6/1986 | United Kingdom |
| 2196401 | 4/1988 | United Kingdom |
| 2198201 | 6/1988 | United Kingdom |
| 2217411 | 10/1989 | United Kingdom |
| 2219368 | 12/1989 | United Kingdom |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

A brake system providing traction slip of the controlled driven wheels. The rotating pattern of the driven wheels is permanently monitored by sensors (S1, S3 and S2, S4, respectively). In the event that one of the driven wheels tends to spin, the system switches to the traction slip mode so that a drive M of two pumps (21, 26) is actuated and an ASR valve (80) reswitched causing the air pressure to be applied to the booster chamber of the servo system (3) and the master cylinder to be actuated independently of the pedal actuation. During the start-up phase of the pumps (21, 26) pressure fluid is passed from the master brake cylinder to the driven wheels enabling a fast and effective pressure build-up in the wheel brakes of the driven wheels to effectively prevent the wheels from spinning. The master cylinder (2) therefore provides the function of an accumulator.

5 Claims, 2 Drawing Sheets

HYDRAULIC BRAKE SYSTEM FOR AUTOMOTIVE VEHICLES COMPRISING A TRACTION SLIP CONTROL MEANS

BACKGROUND OF THE INVENTION

The present invention relates to a hydraulic brake system for automotive vehicles comprising a traction slip control system including a master cylinder and a pedal-operated servo system for actuating the master brake cylinder. The booster chamber of the servo system is placed in communication with a pressure source at any pedal position. An electronic analyzer generates a signal when one of the wheels tends to spin.

A brake system of the afore-mentioned type has been described, for example, in German patent document DE-OS 36 35 0 054. This type of brake system for traction slip control evolved from a brake system for brake slip control. This is because means, such as sensors, evaluation units, valves, etc., which are suitable to prevent the wheels from locking during deceleration, also can be employed to prevent the wheels from spinning in the start-up phase—i.e., traction slip control However, in brake systems of this type a problem is presented. That is, to avoid locking of a wheel, the pressure in the wheel brake cylinders must be rapidly decreased which is accomplished by opening the corresponding outlet valve so that pressure fluid escapes into a reservoir. However, to prevent wheel spinning, first a pressure must be built up. For a conventional system, this means that the pumps are actuated to deliver pressure fluid to the brake conduits. However, it takes a significant period of time before the pump reaches its full discharge capacity which means that the pressure in the wheel brake cylinders cannot be sufficiently rapidly developed as is required to safely prevent the wheel from racing. The noted German patent document, therefore, suggests associating accumulators with the pressure conduits of the pumps, thereby, in the initial phase of the pump, supplying pressure fluid to the inflow conduits. Disadvantageously, monitoring of such accumulators requires substantial mechanical efforts. For example, both a release valve and a pressure switch for monitoring the loading operation of the accumulator must be provided. Moreover, additional valves are required to enable the accumulator to be charged. In addition, valves must be inserted into the brake conduits to prevent the pressure fluid from passing from the accumulator, through the non-actuated master brake cylinder, into the reservoir.

It is therefore an object of the present invention to provide the noted brake system such that the initial phase of the pump, in a traction slip control, and despite simplified mechanical measures, adequately can be provided.

SUMMARY OF THE INVENTION

Briefly, in accordance with the present invention, the master brake cylinder, in a traction slip control brake system, serves as an accumulator. Through actuation of the servo system, a pressure develops in the master brake cylinder, corresponding to the point of maximum boosting of the servo system, which pressure becomes directly effective in the wheel brakes. The system provides the additional advantage that it does not require the provision of any additional valves in the brake conduits as, upon actuation of the master cylinders, the working chambers of the master cylinder are separated from the reservoir. Moreover, the provision of release valves can be eliminated as the central valves in the master cylinder serve as control valves. The pressure in the brake conduits cannot exceed the value of the predetermined point of maximum boosting of the servo system.

This configuration is particularly advantageous where the servo system is a vacuum brake force booster. Vacuum brake force boosters of this type exhibit a brake valve located in a control sleeve provided with a first passageway terminating in the vacuum chamber of the brake force booster. The booster chamber, through the above noted passageway, is ventilated when the brake is not applied. Once a hose terminating in an external connection is coupled to the first passageway, which external connection, through a valve, is capable of being brought in communication either with a vacuum source or with the atmosphere, ventilation of the booster chamber readily is effected without affecting the function of the brake force booster during a normal deceleration process. This is because, normally, the noted connection is in abutment with the vacuum source so that there will be no functional difference over the brake force boosters of standard design. Once the valve is switched over, air will flow through the hose into the first passageway and, through the brake valve, into the booster chamber, thereby forcing the booster plate toward the master brake cylinder causing the latter to be actuated.

While the servo system is so actuated, the position of the wall can be randomly determined and therefore a pedal switch is provided. The pedal switch is actuated by the pedal, as the position of the pedal is clearly combined with the position of the booster wall of the servo system. The switch can turn the pump drive on and off. By defining the switch point, the pedal can be randomly positioned.

BRIEF DESCRIPTION OF THE DRAWING

The invention will now be described with reference to one embodiment in the following detailed description when taken in conjunction with the accompanying drawing wherein.

DETAILED DESCRIPTION

Figure 1:
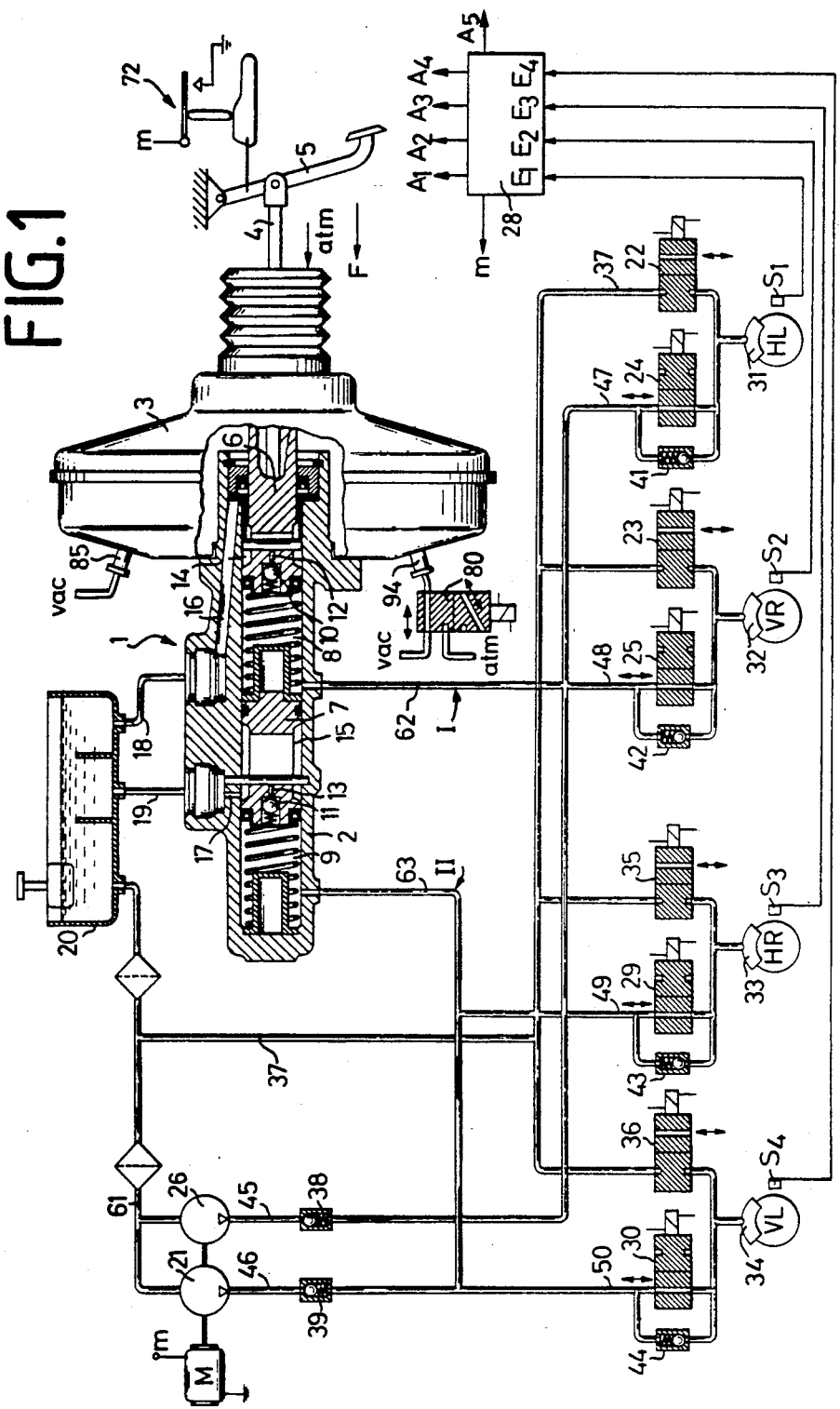
FIG. 1 illustrates the hydraulic diagram in accordance with the present invention with the servo system being schematically illustrated; and, FIG. 2 shows the servo system in greater detail.
Figure 2:
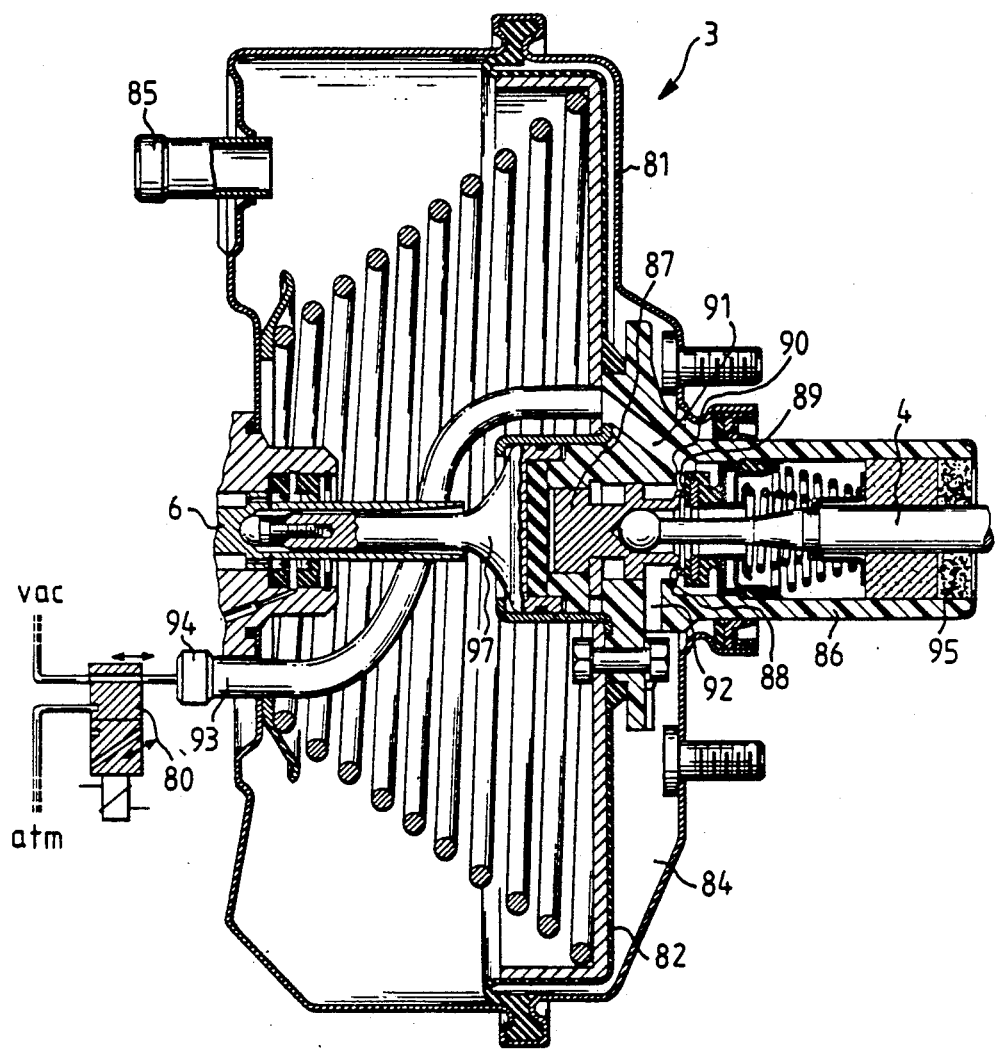

Referring now to FIG. 1, there is shown a brake pressure generator 1 comprising a master brake cylinder 2 and a vacuum booster 3 coupled thereto. Pedal force F, which is applied in known manner through a push rod 4 to a brake pedal 5, is transferred to the vacuum booster 3 from where it is transmitted, through auxiliary force, to the working pistons 6 and 7 of the master brake cylinder 2. In the release position of the brake as illustrated, the pressure chambers 8, 9 of the master brake cylinder 2 through opened central control valves 10, 11 through connecting channels 12, 13 within the interior of the pistons 6, 7 and through annular chambers 14, 15, connecting bores 16, 17 and through hydraulic conduits 18, 19 are in communication with a pressure equilibrium and pressure fluid reservoir 20. The two brakes circuits of the master cylinder 2, have electromagnetically actuable so or inlet valves 24, 25, 29, and 30 that normally open and in communication with the wheel brakes 31, 32, 33 and 34. The wheel brakes 31, 32, 33, 34, moreover are in communication with electromagnetically actuable outlet valves 22, 23 and 35, 36, so-called SO-valves, blocked in the basic position and, through a hydraulic return conduit 37, are in communication with the pressure equilibrium reservoir 20.

Connected in parallel to the inlet valves 24, 25, 29, 30, respectively, are one each non-return valves 41, 42, 43, 44 blocking in the direction toward the wheel brake. The brake system, in addition, includes two pumps 21, 26 actuated by a motor M. The intake sides of the pumps are in communication through an intake conduit 61 with the pressure fluid reservoir 20. The pressure conduits 45, 46 terminate in the brake conduits 62, 63. Each of the pressure conduits includes a check valve 38, 29 blocking in the direction toward the pump. Each of the brake conduits 62, 63 branches into respectively one of brake conduits 47, 48 and 49, 50, respectively toward the wheel brakes.

The vacuum booster 3 comprises a housing 81 in which a plate 82 is sealingly guided The plate 82 subdivides the housing 81 into a vacuum chamber 83 and a booster chamber 84. The vacuum chamber 83, through an intake connection 85, is in permanent communication with a vacuum source The plate 82 is screwed to a control sleeve 86 sealingly guided through the rear wall of the housing 81. The control sleeve 86 receives a valve piston 87 which is actuated by the pedal 5, through the push rod 4. The valve piston 87 actuates a valve disk 88 through an internal sealing seat 89. An external sealing seat 90 is provided on the control sleeve 86. In the non-actuated position of the servo system as illustrated, the internal sealing seat 89 is in abutment with the valve disk 88. Upon actuation of the push rod 4, the internal sealing seat 89 separates from the valve disk 88 thereby enabling the valve to abut the external sealing seat 90. Moreover, the control sleeve 86 comprises a first passageway 91 and a second passageway 92. The second passageway 92 terminates in the booster chamber 84 while the first passageway 91 terminates in a hose 93 which, with one end thereof, joins the booster wall 81 and, with the other end thereof, joins the front wall of the housing where a connection 94 is provided which, through the ASR valve 80, is in communication either with the vacuum source or with the atmosphere. The plate 82, through a spring 96, is held in its rearward basic position.

Ventilation of the booster chamber 84 is provided through the atmospheric connection 95 on the rearward end of the control sleeve 86.

The operation of the system will now be described as follows. The drawing figures illustrate the basic position of the brake system. Vacuum prevails both in the vacuum chamber and in the booster chamber as the connection 94 is in abutment with the vacuum source. Communication between the booster chamber 84 and the connection 94 is established through the hose 93, the first passageway 91 past the external sealing seat 90, and through passageway 92. The central valves 10, 11 are opened such that the working chambers 8, 9 and the brake circuits I and II coupled thereto are in communication with the non-pressurized reservoir 20. The pumps 21, 26 are at a standstill while valves 22, 23, 24, 25, 29, 30, 35, 36 are in the basic position as shown.

Once pedal 5 is actuated, valve piston 87 is displaced by means of push rod 4, with valve disk 88, first, being seated on the external sealing seat 90 such that the connection between the vacuum source and the booster chamber 84 is discontinued. Subsequently, the inner sealing seat 89 is separated from the valve disk 88 to permit the ingress of air into the booster chamber 84 through the atmospheric connection 95. The pressure generated in the booster chamber forces valve disk 81 to the front, with the pressure force exerted on the booster plate 82, through the plunger 97, being transferred to the push rod piston 6 of the master cylinder 2. This then generates a pressure in the working chambers 8 and 9 which takes effect in the wheel brakes 31, 32, 33, 34.

In the event that one of the wheels tends to lock, the pump drive M will be actuated causing the pumps 21, 26 to deliver fluid pressure to brake conduits 62, 63. Through switching the inlet and outlet valves, a pressure can be adjusted on each wheel which is adapted to the rotating pattern of the wheels and is so sized)that the wheels run in an optimum slip range in which both high brake forces and lateral forces can be transmitted.

Importance is attached to the function of the system in the event that one of the driving wheels tends to race. This can occur if, during the start-up phase, excessive torques of the engine are transmitted to the wheels or if, during travelling, one of the driving wheels suddenly meets with road conditions permitting only poor adhesion of the wheels. The racing tendency of the wheels, in turn, can be detected by evaluating the sensor signals. Once a situation of this type is detected, the system switches to the traction slip control mode for which purpose, in turn, the pump drive is actuated enabling the pumps 21, 26 to deliver to the brake circuits. As previously explained, during the initial phase, the pumps are not capable of supplying sufficient pressure fluid to enable the brakes of the driven wheels to come into adequate abutment. The ASR-valve 80 is, therefore, reswitched upon commencement of the pump delivery. Communication is established between connection 94 and atmosphere to enable air to flow, through hose 93 and the first passageway 91, past sealing seat 90 and the passageway 92, into the booster chamber. In the booster chamber 84, the full atmospheric pressure will become effective, thereby now forcing the booster plate 82 forwardly and actuating the master cylinder, with pressure fluid being passed from the working chambers 8, 9 into the brake circuits. To prevent this pressure from becoming effective on the non-actuated wheels, the associated inlet valves 35 and 30 are blocked on a rear wheel-driven vehicle. The inlet and outlet valves 22, 24, 35 and 29 of the driven rear wheels now enable a brake pressure to be generated that compensates the excessive brake torque to such an extent that the remaining driving torque is in harmony with the friction relationships between roadway and tire. In a front wheel-driven vehicle, the inlet valves of the rear wheel brakes are blocked and the inlet and outlet valves of the front wheel brakes are excited.

Through actuation of the servo system, irrespective of a pedal actuation, hence, first, adequate pressure fluid is made available in the initial operating phase of pumps 21, 26. The pressure fluid stems from the master cylinder which provides storage. Upon actuation of the master cylinder, also central valves 10 and 11 are blocked so that there is no need for separate valves to be provided in the brake conduits intended to ensure that flow of pressure fluid delivered by the pumps is passed into the reservoir 20.

In the course of the controlling operation, the discharge capacity of the pumps will be adequate to reload the master cylinder such that the pistons 6 and 7 can be restored to their basic position, with central valves 10 and 11 assuming control functions such that the pressure in the master brake cylinder is adjusted to the point of maximum boosting of the servo system 3. The provision of additional release valves precluding the pressure from excessively rising in the brake conduits, equally, can be avoided. As the pistons are restored, the pedal will also be returned to its basic position enabling the driver to interfere at any time with the control by braking, that is, to add a pedal force to the servo force.

Secured to pedal 5 is a switch which can assume a variety of functions. One of such functions is that the pedal, during a brake slip control, is placed into a predetermined position. To achieve this, the motor drive is turned on and off with the aid of the switch 72. The pump drive is actuated only once the pedal is displaced beyond a fixed point. The pressure fluid delivered by the pumps will force back the pistons 6, 7 and, hence, the pedal 5 until the fixed point is reached, thereby actuating the switch and de-actuating the drive of the pumps. In this manner, in response to the switch threshold of the switch, a predetermined pedal position can be realized during the brake slip control and also during the traction slip control.

A second function of the switch is to indicate the pedal actuation during a traction slip control. In this regard, if the system provides for a pedal decoupler (not shown), discontinuation of the traction slip control must be ensured once the driver actuates the pedal. During a traction slip control, the pedal is decoupled from the booster, meaning that the pedal remains in its basic position while the booster wall is moved toward the master cylinder under the influence of the pressure supplied. In this case it is no longer possible for the vehicle to be decelerated by actuating the pedal. Accordingly, a switch will have to be provided for spin the pedal actuation. Based on the switch signals, the traction slip control will cease and the pedal will be coupled to the booster.

What is claimed is:

1. A hydraulic brake system for an automotive vehicle including a means for controlling traction slip comprising wheel sensors, a master brake cylinder (1), a pedal operated servo system (3) for actuating the master brake cylinder (1), wheel brake cylinders on driven wheels of the vehicle which are in communication with the master brake cylinder (1), through brake conduits (62, 63), sensors (S1, S2, S3, S4) for determining angular speed of the wheels, and an electronic analyzer (28) evaluating the sensor signals and generating switch signals for inlet and outlet valves, with the inlet valves (24, 25, 29, 30) being provided in the brake conduits and the outlet valves (22, 23, 35, 36) being provided in a relief conduit (37) between the wheel brake cylinders and a pressure fluid reservoir, and pumps (21, 26) having intake sides which are respectively in communication with the brake conduits (62, 63), wherein a booster chamber (84) of the servor system is placed in communication with a pressure source through an ASR control valve (80), irrespective of positions of the pedal (5), and wherein the electronic analyzer (28) generates switching signals for operating said control valve (80) and said pumps (21, 26) upon detection, through the sensor signals, that one of the driven wheels tends to spin, and wherein upon detection of the driven wheel tending to spin, said pumps (21, 26) are activated and said control valve (80) is switched causing air pressure to be applied to said booster chamber (84) of said servo system (3) wherein said master cylinder (1) is actuated independently of actuation of the pedal (5) and wherein during an initial start-up phase of said pumps (21, 26) pressure fluid is transmitted from the master brake cylinder to the driven wheels to prevent the wheels from spinning during the start-up phase of said pumps 21, 26).

2. A brake system according to claim 1, wherein the servo system includes a brake valve located in a control sleeve (86), with the control sleeve (86) comprising a first passageway (91) and an atmospheric connection (95) and one of (i) the first passageway (91) or (ii) the atmospheric connection (95) is in communication with a second passageway of a control housing (86) terminating in the booster chamber (84) as determined by the control valve.

3. A brake system according to claim 2, wherein the first passageway (91) is in communication through a hose with a connection (94) located in a master cylinder-sided wall of a housing (81) of a vacuum brake force booster (3).

4. A brake system according to claim 3, wherein the connection (94) in said wall is in communication through the control valve (80) either with a vacuum source or with the atmosphere.

5. A brake system according to claim 1, wherein a switch (72) is provided on the pedal (5), which is actuated in a defined position of the pedal.

* * * * *